US010272502B1

(12) United States Patent
Webb et al.

(10) Patent No.: US 10,272,502 B1
(45) Date of Patent: Apr. 30, 2019

(54) ALIGNMENT DEVICE FOR ALIGNING A DRILL BIT WITH A PILOT HOLE

(71) Applicant: The Boeing Company, Chicago, IL (US)

(72) Inventors: Jeremiah Danney Webb, Mukilteo, WA (US); Daniel Ashley Hippe, Seattle, WA (US)

(73) Assignee: The Boeing Company, Chicago, IL (US)

( * ) Notice: Subject to any disclaimer, the term of this patent is extended or adjusted under 35 U.S.C. 154(b) by 0 days.

(21) Appl. No.: 15/800,757

(22) Filed: Nov. 1, 2017

(51) Int. Cl.
*B23B 47/28* (2006.01)

(52) U.S. Cl.
CPC .......... *B23B 47/28* (2013.01); *B23B 2215/04* (2013.01); *B23B 2247/08* (2013.01); *B23B 2270/08* (2013.01)

(58) Field of Classification Search
CPC .. B23B 47/28; B23B 2247/08; B23B 2270/12
USPC .......................................................... 408/75
See application file for complete search history.

(56) References Cited

U.S. PATENT DOCUMENTS

| 1,831,813 A * | 11/1931 | Levedahl ................ B23B 49/02 408/112 |
| 9,849,360 B2 * | 12/2017 | Carroll, Jr. ............. A63B 57/10 |
| 2007/0248426 A1 * | 10/2007 | Pettersson ............. B23B 49/023 408/3 |

FOREIGN PATENT DOCUMENTS

| DE | 4001919 C1 * | 10/1990 | ......... B23Q 3/15533 |
| GB | 356942 A * | 9/1931 | ............. B23B 47/28 |

* cited by examiner

*Primary Examiner* — Alan Snyder
(74) *Attorney, Agent, or Firm* — McDonnell Boehnen Hulbert & Berghoff LLP

(57) ABSTRACT

Example alignment devices for aligning a drill bit with respect to a pilot hole and methods of use are described herein. An example alignment device includes a base having a first surface and a second surface, where the first surface is opposite the second surface. The alignment device also includes an alignment pin extending from the first surface of the base. The alignment device also includes a support extending from the second surface of the base and positioned such that a longitudinal axis of the alignment pin is separated from the support by an offset distance. An inner surface of the support has a radius of curvature along a length of the support. The radius of curvature is substantially equal to the offset distance, and a center of curvature of the support is coaxial with the longitudinal axis of the alignment pin.

20 Claims, 16 Drawing Sheets

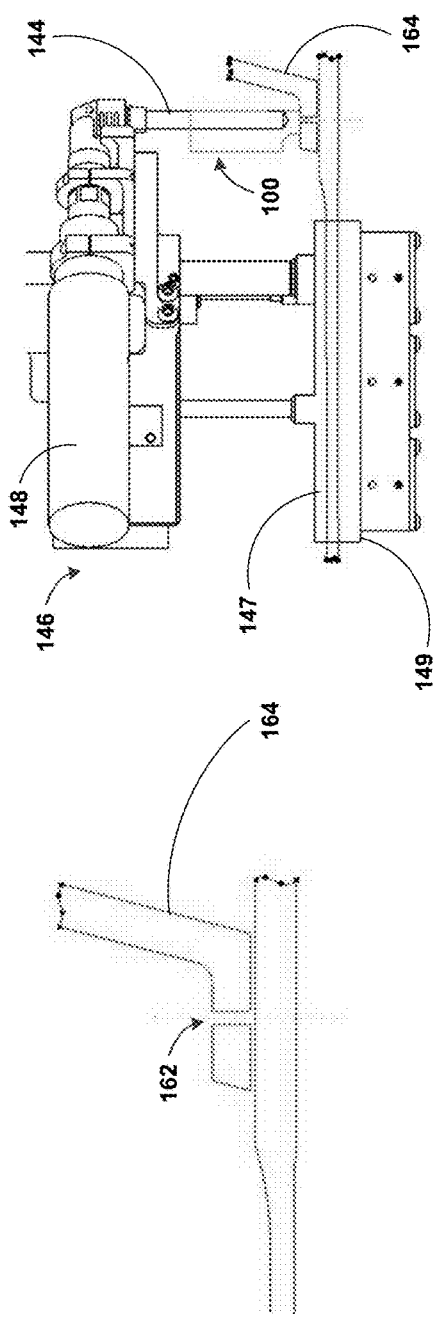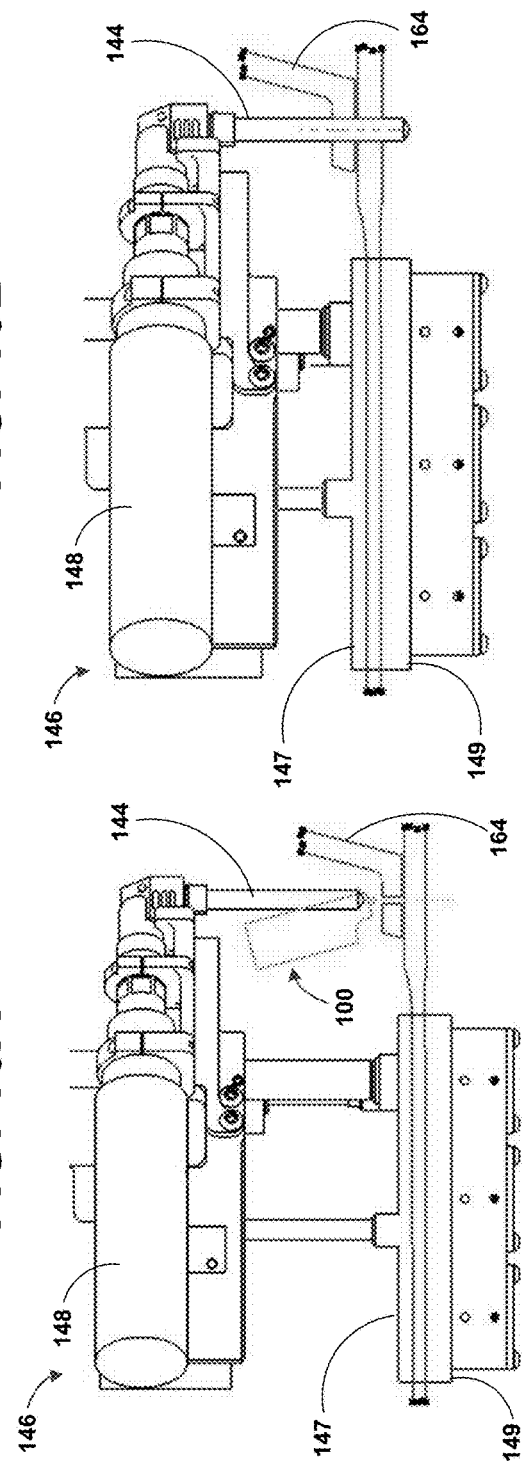

ALIGNMENT DEVICE FOR ALIGNING A DRILL BIT WITH A PILOT HOLE

FIELD

The present disclosure relates generally to an alignment device for aligning a drill bit of a drill assembly with a pilot hole, and corresponding systems and methods for aligning the drill bit of the drill assembly with the pilot hole.

BACKGROUND

Current airplane wing manufacturing can require several holes to be drilled by a mechanic in tight and difficult to access positions. Currently, mechanics use a drill jig to locate and drill an undersized pilot hole. The mechanic may then remove the drill jig from the pilot hole and drill the pilot hole up to the final full hole diameter. Such a procedure is typically done in multiple steps, using a drill cup to aid in keeping the drill bit normal to the drilling surface. However, in reaching to drill hole locations in difficult to access locations, it may become difficult to keep the drill cup stationary and on the drilling surface. This may result in misdrilled and/or misangled holes.

One solution to this problem is to create a standalone drill motor that can clamp to the drilling surface and power feed the drill bit through the surface, thereby ensuring holes are perpendicular to the drilling surface. In some instances, this solution may help with the issue of misdrilled and/or misangled holes, but can require indexing to the drilling surface as part of the drill motor. This requires multiple variations of drill motors for each hole location on the drilling surface, with custom indexing for each drill motor, which can become very costly.

SUMMARY

In a first aspect, an alignment device is described. The alignment device includes a base having a first surface and a second surface, wherein the first surface is opposite the second surface. The alignment device also includes an alignment pin extending from the first surface of the base. The alignment device also includes a support extending from the second surface of the base and positioned such that a longitudinal axis of the alignment pin is separated from an inner surface of the support by an offset distance, wherein the inner surface of the support has a radius of curvature along a length of the support, wherein the radius of curvature is substantially equal to the offset distance, and wherein a center of curvature of the support is coaxial with the longitudinal axis of the alignment pin.

In a second aspect, a system for aligning a drill bit with respect to a pilot hole is described. The system includes a drill assembly comprising (i) the drill bit, and (ii) a motor being configured to rotate the drill bit. The system also includes an alignment device configured to be positioned in abutment with the drill bit of the drill assembly, the alignment device comprising (i) a base having a first surface and a second surface, wherein the first surface is opposite the second surface, (ii) an alignment pin extending from the first surface of the base, and (iii) a support extending from the second surface of the base and positioned such that a longitudinal axis of the alignment pin is separated from an inner surface of the support by an offset distance, wherein the inner surface of the support has a radius of curvature along a length of the support, wherein the radius of curvature is substantially equal to the offset distance, and wherein a center of curvature of the support is coaxial with the longitudinal axis of the alignment pin.

In a third aspect, a method for aligning a drill assembly with respect to a pilot hole is described. The method includes (a) positioning a drill bit of the drill assembly in abutment with an alignment device, wherein the alignment device comprises (i) a base having a first surface and a second surface, wherein the first surface is opposite the second surface, (ii) an alignment pin extending from the first surface of the base, and (iii) a support extending from the second surface of the base and positioned such that a longitudinal axis of the alignment pin is separated from an inner surface of the support by an offset distance, wherein the inner surface of the support has a radius of curvature along a length of the support, wherein the radius of curvature is substantially equal to the offset distance, and wherein a center of curvature of the support is coaxial with the longitudinal axis of the alignment pin, (b) positioning the alignment pin into the pilot hole on a surface such that the longitudinal axis of the alignment pin is coaxial with a center of the pilot hole, and (c) fixing a position of the drill assembly with respect to the surface.

The features, functions, and advantages that have been discussed can be achieved independently in various embodiments or may be combined in yet other embodiments further details of which can be seen with reference to the following description and figures.

BRIEF DESCRIPTION OF THE FIGURES

The novel features believed characteristic of the illustrative embodiments are set forth in the appended claims. The illustrative embodiments, however, as well as a preferred mode of use, further objectives and descriptions thereof, will best be understood by reference to the following detailed description of an illustrative embodiment of the present disclosure when read in conjunction with the accompanying figures, wherein:

FIGS. 16A-16D illustrate the method steps of using the alignment device, according to an example embodiment.

DETAILED DESCRIPTION

Figure 1:
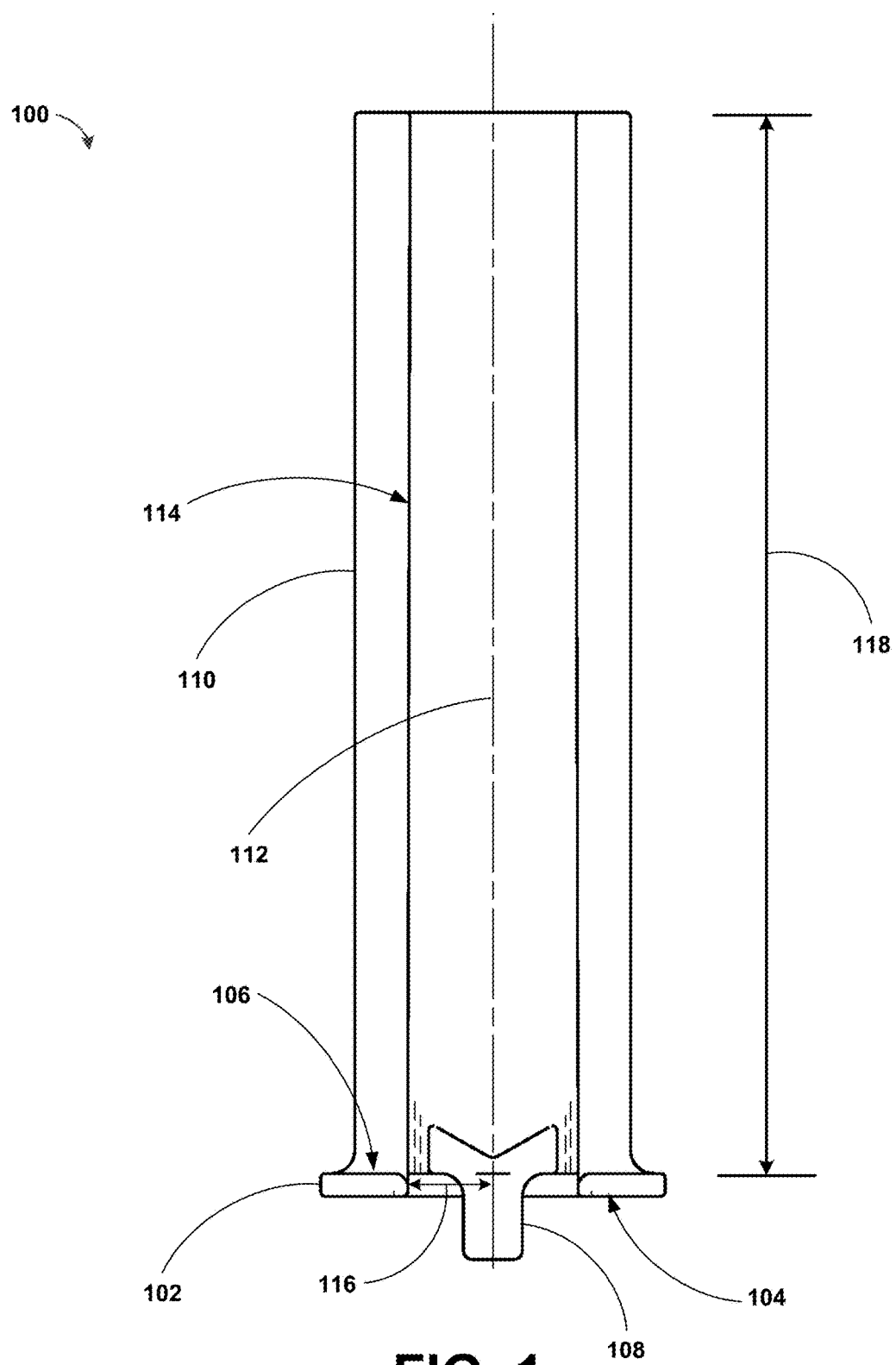
FIG. 1 is a front view of an alignment device, according to an example embodiment.

The present disclosure describes an alignment device for aligning a drill bit to a pilot hole. The alignment device described herein can remove the need to have several variations of the drill motors by removing custom indexing. Instead, a single alignment device and a single drill motor may be used in a variety of locations on the drilling surface to drill the holes necessary for manufacturing. The alignment device can allow the user to align the drill motor assembly to an existing pilot hole. Once the drill bit of the drill motor is aligned and the drill motor is clamped in place, the alignment device can be removed from the drill bit and the full size hole may be drilled. The alignment device described herein may provide cost savings due to cost avoidance of nonconformance records (NCRs) generated due to misdrilled and/or misangled holes. Further, the alignment device described herein may provide cost savings from existing indexed drill motor assemblies due to a reduction in the number of drill motors required by removing custom indexing.

An example alignment device may include a base, (ii) an alignment pin extending from the bottom of the base, and (iii) a support extending from the top surface of the base. The base may be positioned such that a longitudinal axis of the alignment pin is separated from an inner surface the support by an offset distance. This offset distance may correspond to a radius of the drill bit, such that when the drill bit is positioned in abutment with the alignment device, the longitudinal axis of the drill bit is coaxial with the longitudinal axis of the alignment pin, which is further coaxial to the longitudinal axis of the pilot hole.

As such, the alignment device allows the user to align the drill motor assembly to an existing pilot hole. In use, the alignment device may be positioned in abutment with a drill bit of a drill assembly. The alignment pin of the alignment device may then be positioned into a pilot hole on a surface such that a longitudinal axis of the alignment pin is coaxial with a center of the pilot hole. The drill assembly may be fixed with respect to the surface. Once the drill bit is positioned in abutment with the alignment device and the drill assembly is clamped in place, the alignment device can be removed from abutment with the drill bit and the full size hole may be drilled.

As used herein, with respect to measurements, "about" means +/−5%. As used herein, with respect to measurements, "substantially" means +/−5%. As used herein, a plane is "substantially perpendicular" to an axis when there is a ninety degree angle between them +/−5%. As used herein, "indexing" a drill bit to a pilot hole means aligning a drill bit with respect to a pilot hole such that the longitudinal axis of the drill bit is coaxial with the longitudinal axis of the pilot hole. As used herein, a "major arc" is an arc of a circle that is greater than 180 degrees. As used herein, a "minor arc" is an arc of a circle that is less than 180 degrees.

Disclosed embodiments will now be described more fully hereinafter with reference to the accompanying figures, in which some, but not all of the disclosed embodiments are shown. Indeed, several different embodiments may be provided and should not be construed as limited to the embodiments set forth herein. Rather, these embodiments are provided so that this disclosure will be thorough and complete and will fully convey the scope of the disclosure to those skilled in the art. Illustrative, non-exhaustive examples, which may or may not be claimed, of the subject matter according the present disclosure are provided below. Various other features of the example devices and systems discussed above, as well as methods for using these devices, are also described hereinafter with reference to the accompanying figures.

Referring generally to FIGS. 1-13, an exemplary alignment device 100 for aligning a drill bit, such as drill bit 144 (shown in FIGS. 16B-16D), to a pilot hole, such as pilot hole 162 (shown in FIG. 16A), is disclosed. In particular, FIG. 1 illustrates a front view of an example alignment device 100. The alignment device 100 includes a base 102 having a first surface 104 and a second surface 106. The first surface 104 is positioned opposite the second surface 106. The alignment device 100 also includes an alignment pin 108 extending from the first surface 104 of the base 102. In one example, the base 102 may be recessed with respect to the alignment pin 108 to provide improved rigidity of the alignment device 100. Further, in one particular example, the alignment pin 108 may have a diameter configured to fit in a #30 pilot hole having a diameter of 0.1285 inches (3.26 millimeters). The alignment device 100 also includes a support 110 extending from the second surface 106 of the base 102 and positioned such that a longitudinal axis 112 of the alignment pin 108 is separated from an inner surface 114 of the support 110 by an offset distance 116. A ratio of the length 118 of the support 110 to the radius of curvature 122 may range from about 3:1 to about 20:1.

Figure 2:
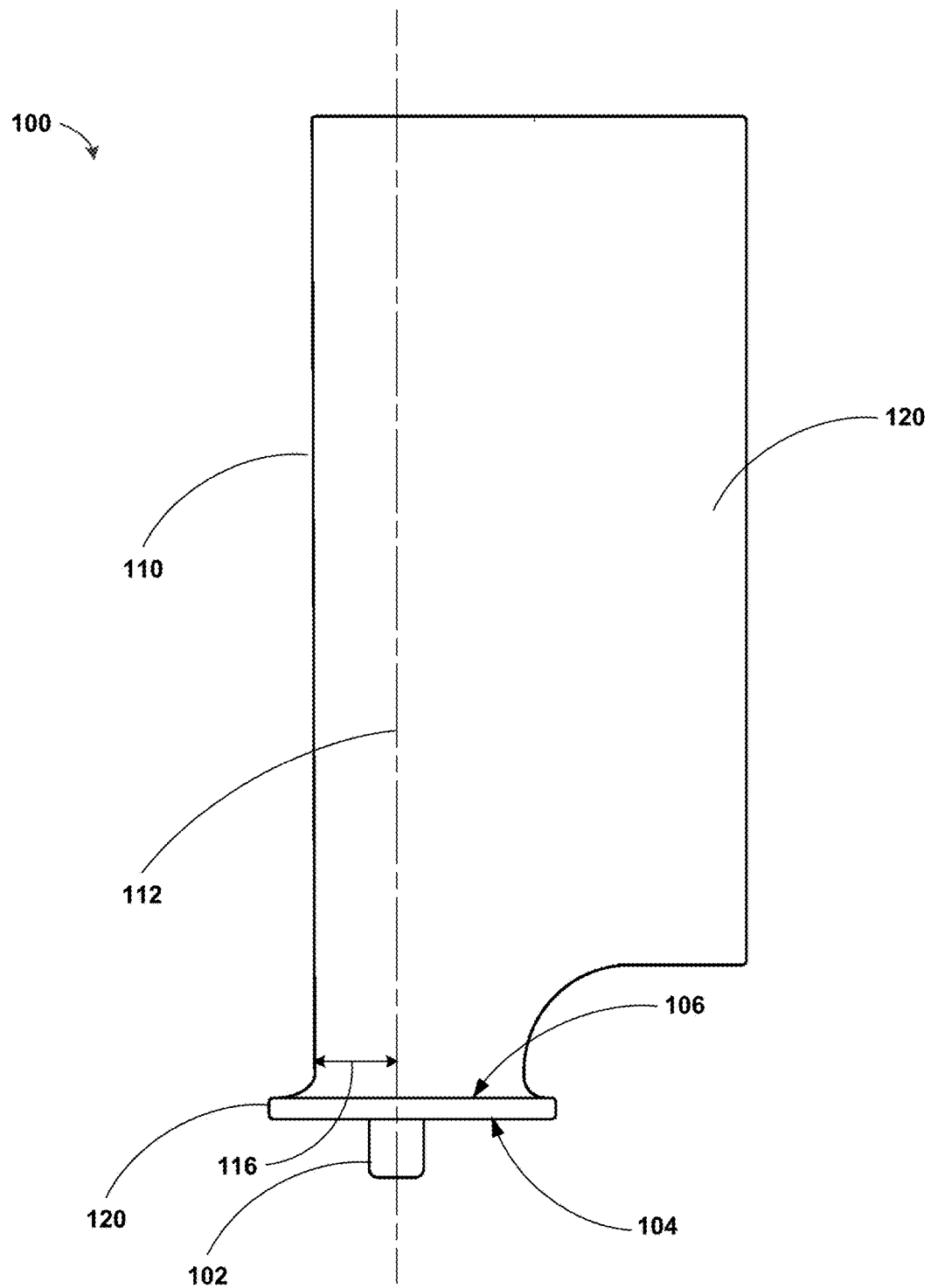
FIG. 2 is side view of the alignment device of FIG. 1.
Figure 3:
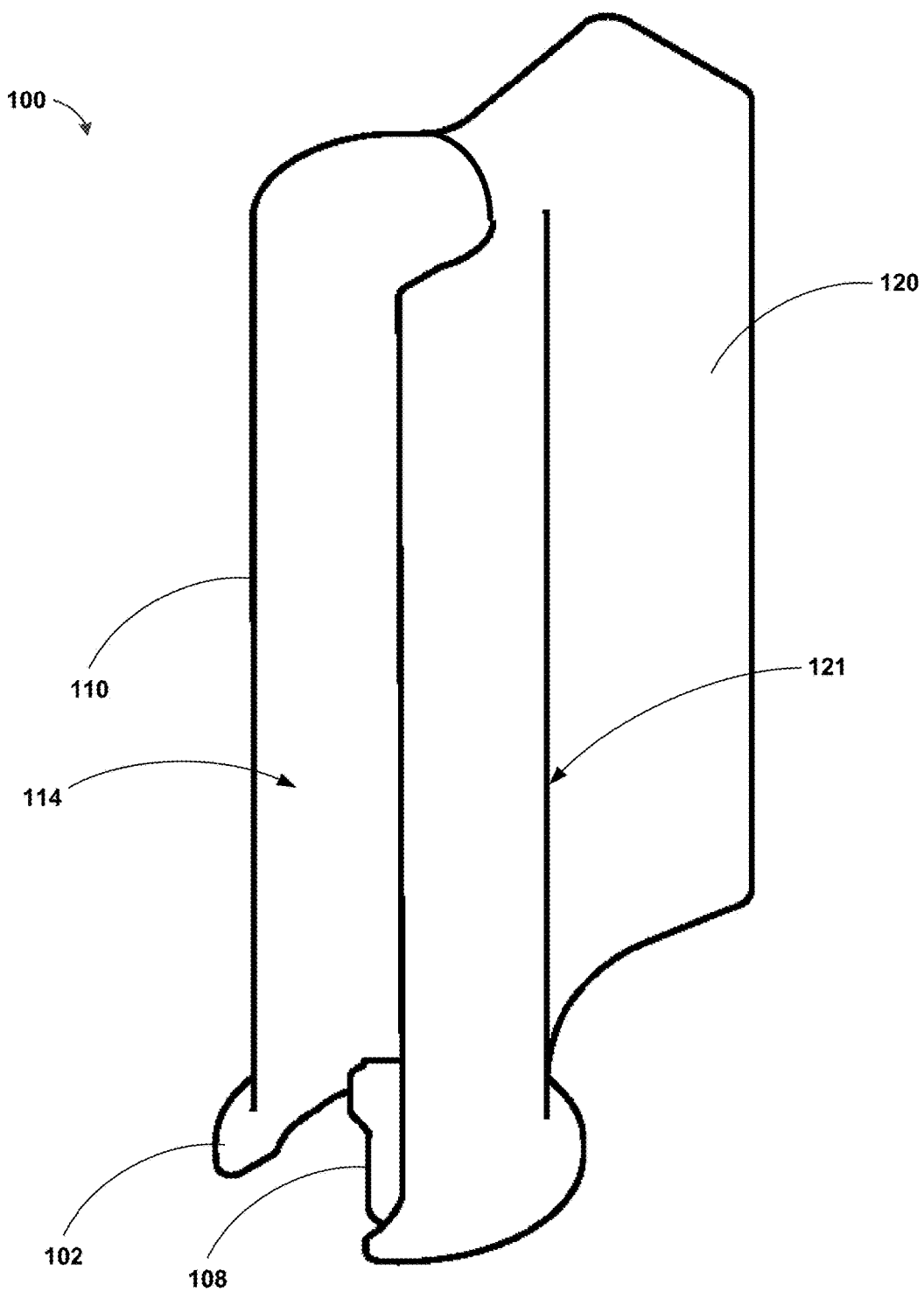
FIG. 3 is a perspective view of the alignment device of FIG. 1.

FIG. 2 illustrates a side view of the alignment device 100 of FIG. 1, and FIG. 3 illustrates a perspective view of the alignment device of FIG. 1. As shown in FIGS. 2 and 3, the alignment device 100 may also include a fin 120 extending from an outer surface 121 of the support 110 in a direction away from the longitudinal axis 112 of the alignment pin 108. The fin 120 is configured to enable an operator to grip the alignment device 100 when in use.

Figure 4:
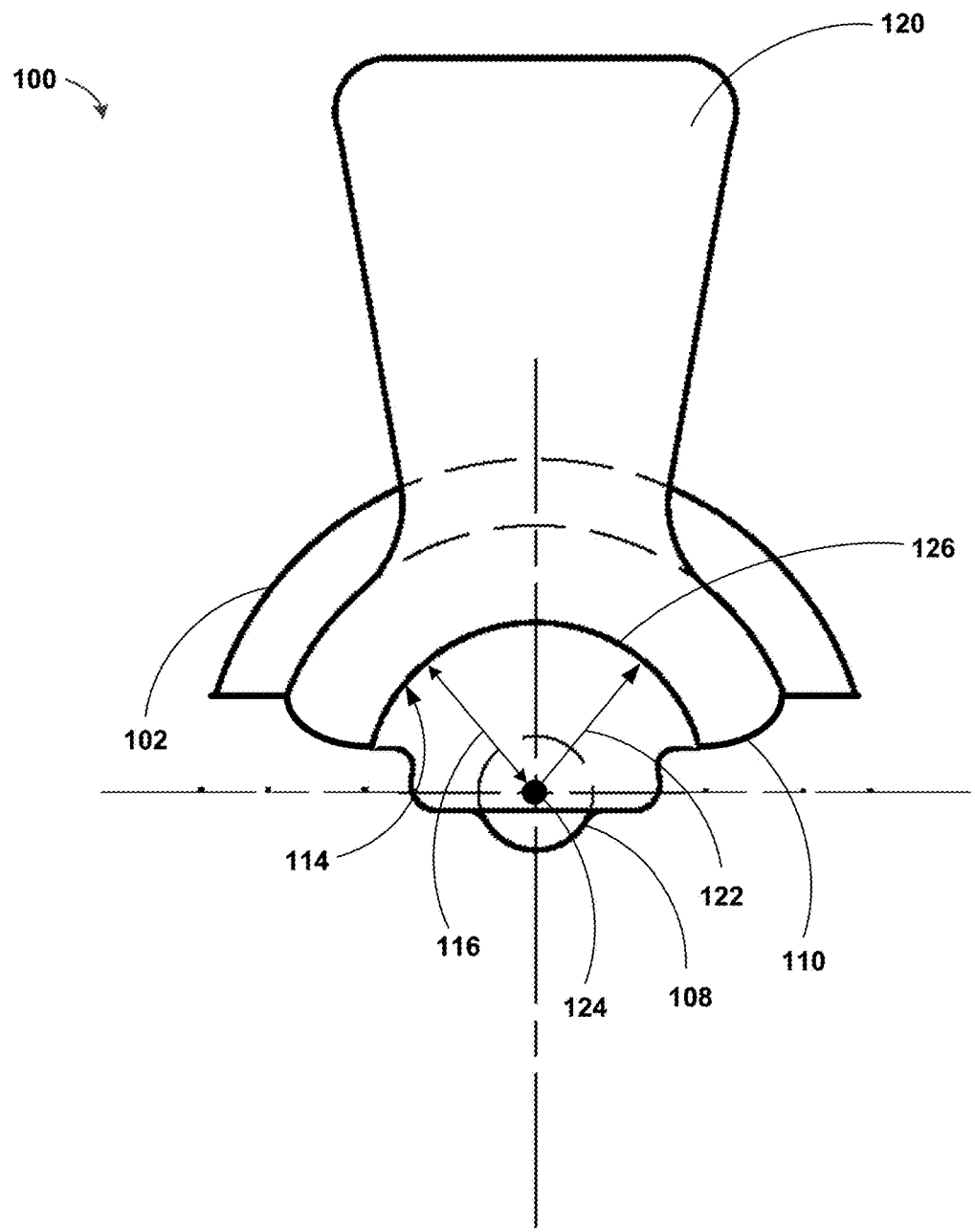
FIG. 4 is a top view of an example alignment device, according to an example embodiment.
Figure 5:
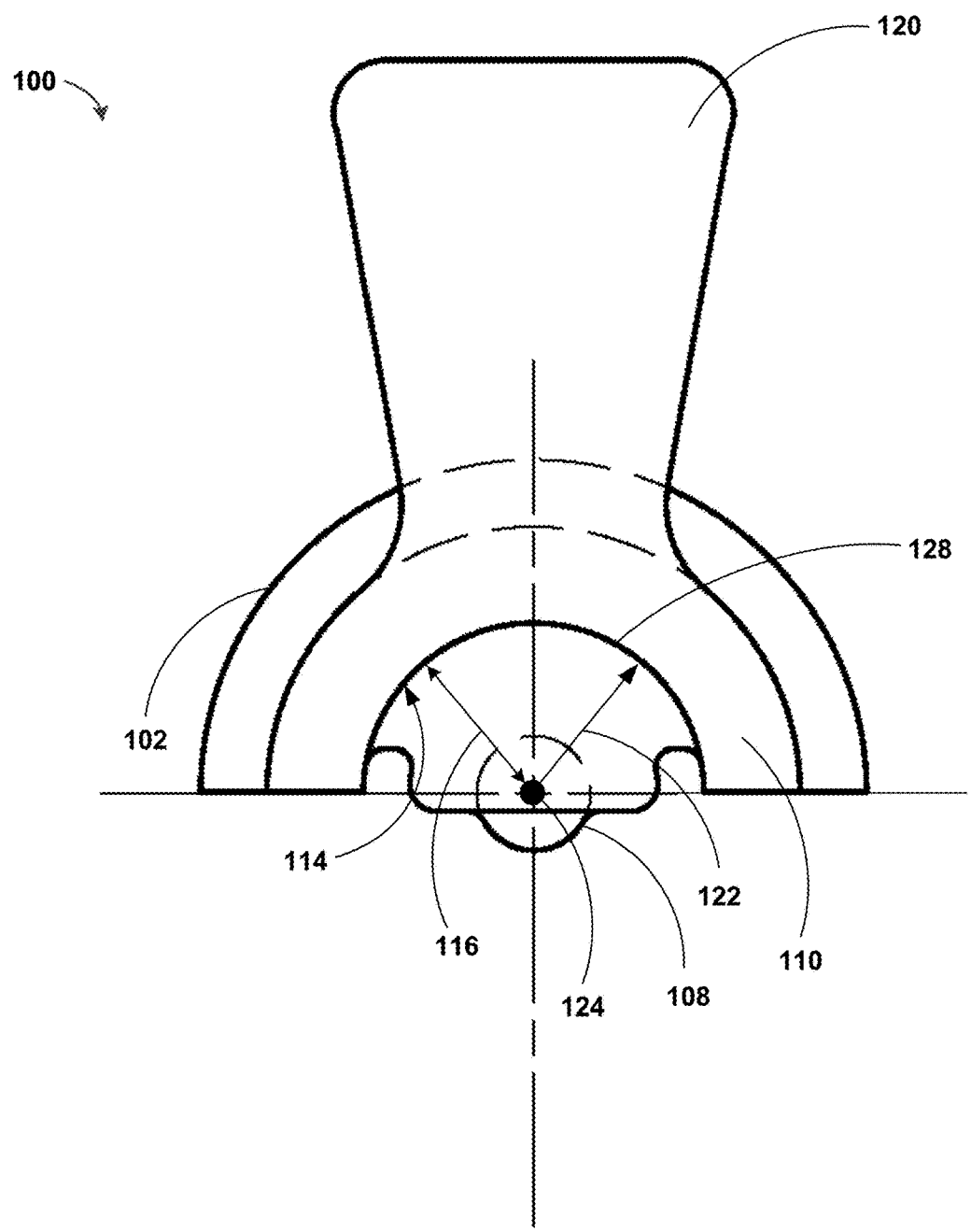
FIG. 5 is a top view of another example alignment device, according to an example embodiment.
Figure 6:
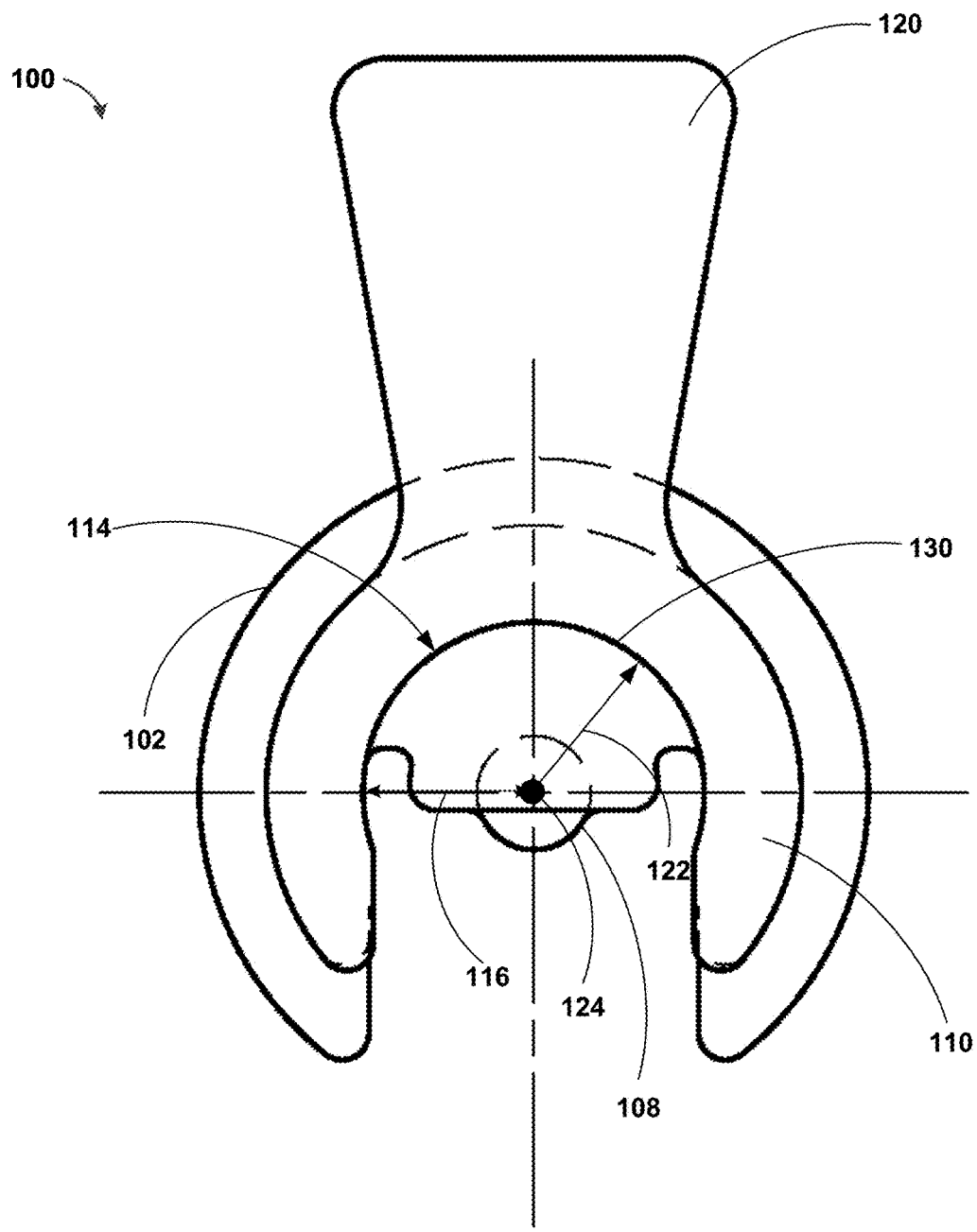
FIG. 6 is a top view of another example alignment device, according to an example embodiment.

FIGS. 4-6 illustrate a top view of example alignment devices 100. As shown in FIGS. 4-6, the inner surface 114 of the support 110 may have a radius of curvature 122 along the length 118 of the support 110. As such, a cross-section of the support 110 in a plane perpendicular to the longitudinal axis 112 of the alignment pin 108 has the radius of curvature 122. In such an example, the radius of curvature 122 is substantially equal to the offset distance 116, and a center of curvature 124 of the support 110 is coaxial with the longitudinal axis 112 of the alignment pin 108.

In one example, as shown in FIG. 4, a cross-section of the support 110 in a plane perpendicular to the longitudinal axis 112 of the alignment pin 108 includes a minor arc 126. In such an example, the minor arc 126 of the cross-section of the support 110 is less than semicircular. In another example, as shown in FIG. 5, a cross-section of the support 110 in a plane perpendicular to the longitudinal axis 112 of the alignment pin 108 includes a semicircle 128.

In yet another example, as shown in FIG. 6, the cross-section of the support 110 in a plane perpendicular to the longitudinal axis 112 of the alignment pin 108 includes a major arc 130. In such an example, the major arc 130 of the cross-section of the support 110 is greater than semicircular. In such an example, the support 110 may include a flexible material such that the support 110 is moveable between an open position and a closed position. The flexible material enables a user to position the alignment device 100 in abutment with a drill bit while the support 110 is in the open position, and the support 110 snaps shut around the drill bit in the closed position.

Figure 7:
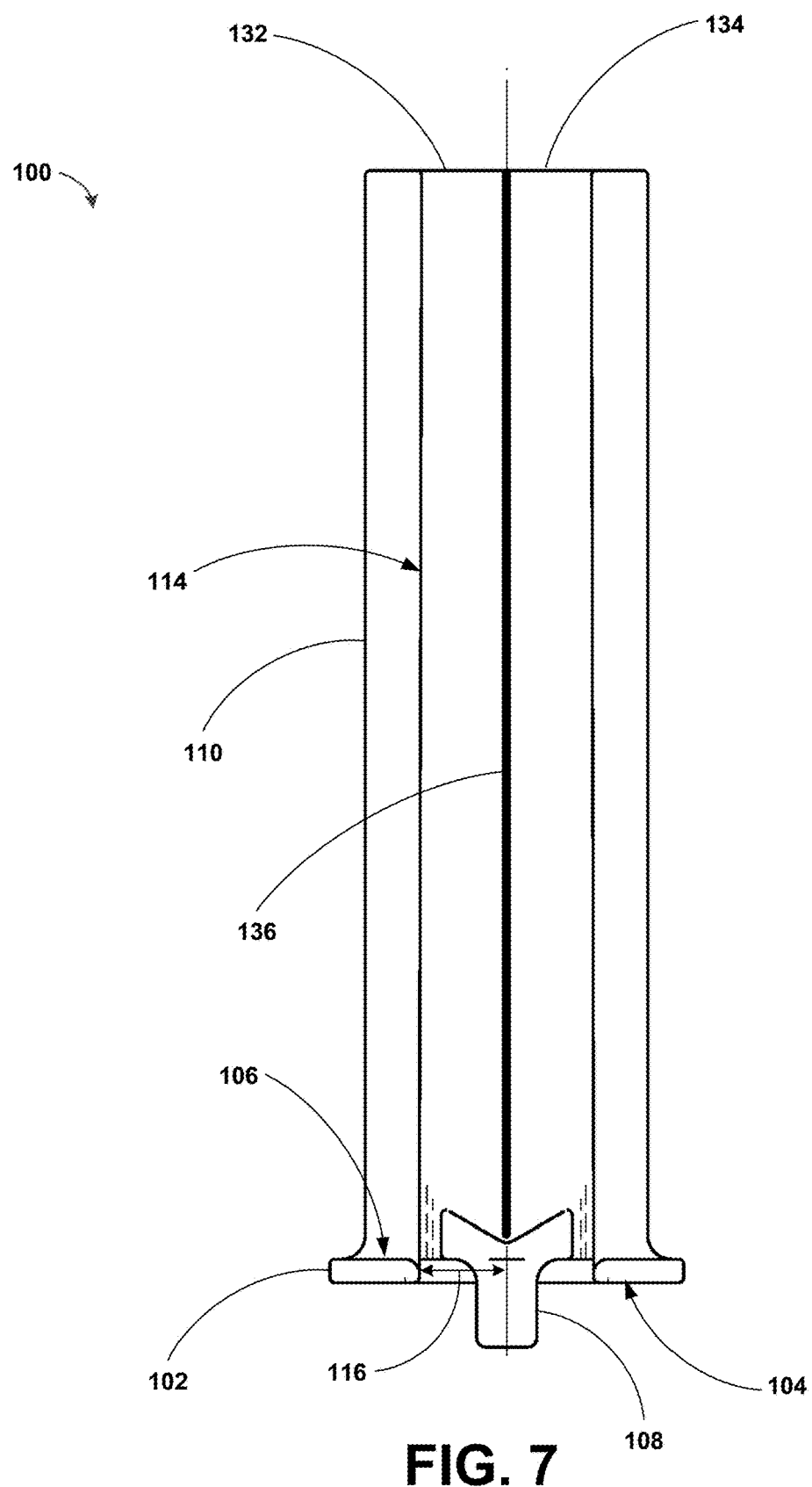
FIG. 7 is a front view of another example alignment device, according to an example embodiment.
Figure 8:
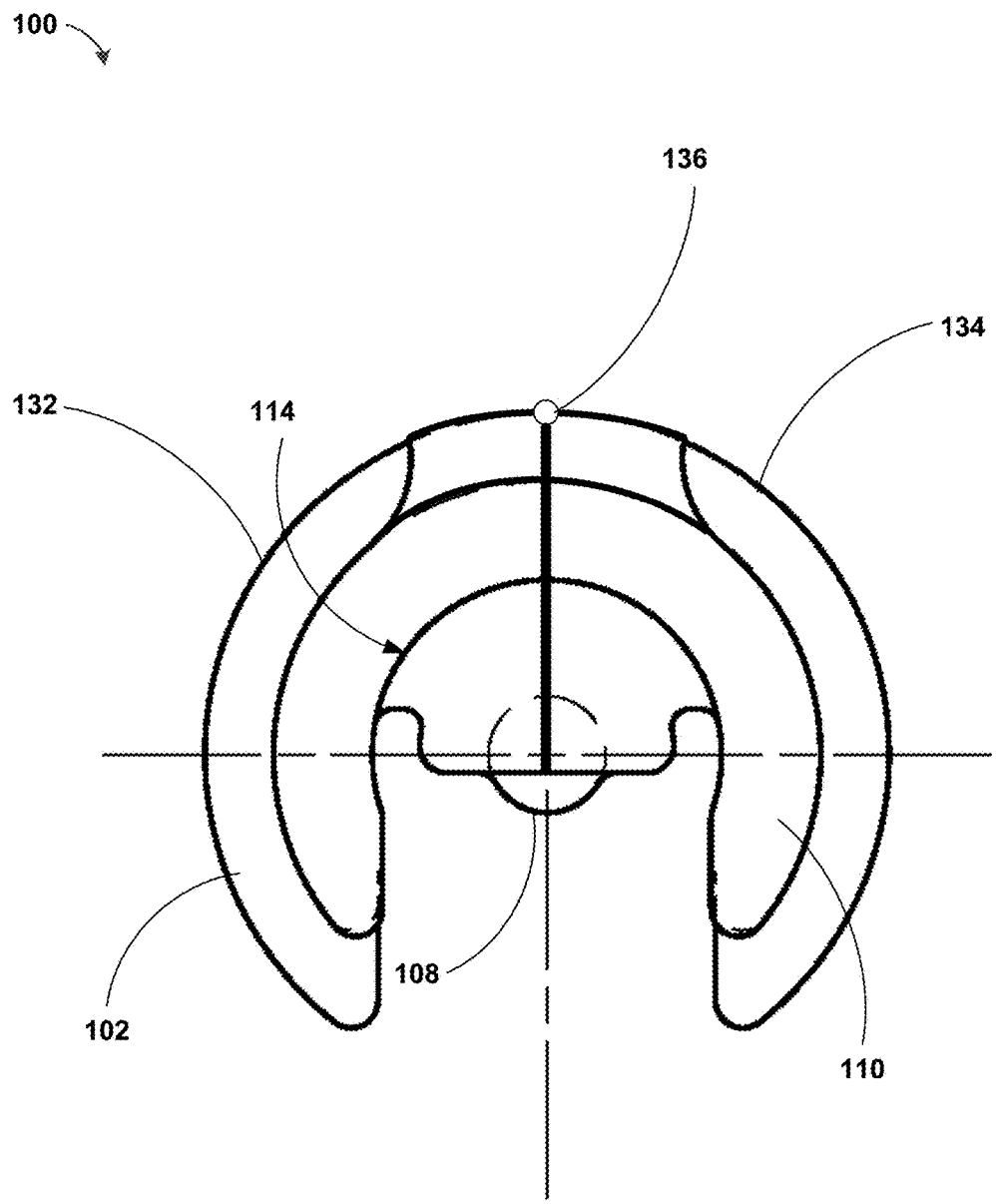
FIG. 8 is a top view of the alignment device of FIG. 7 in a closed position.
Figure 9:
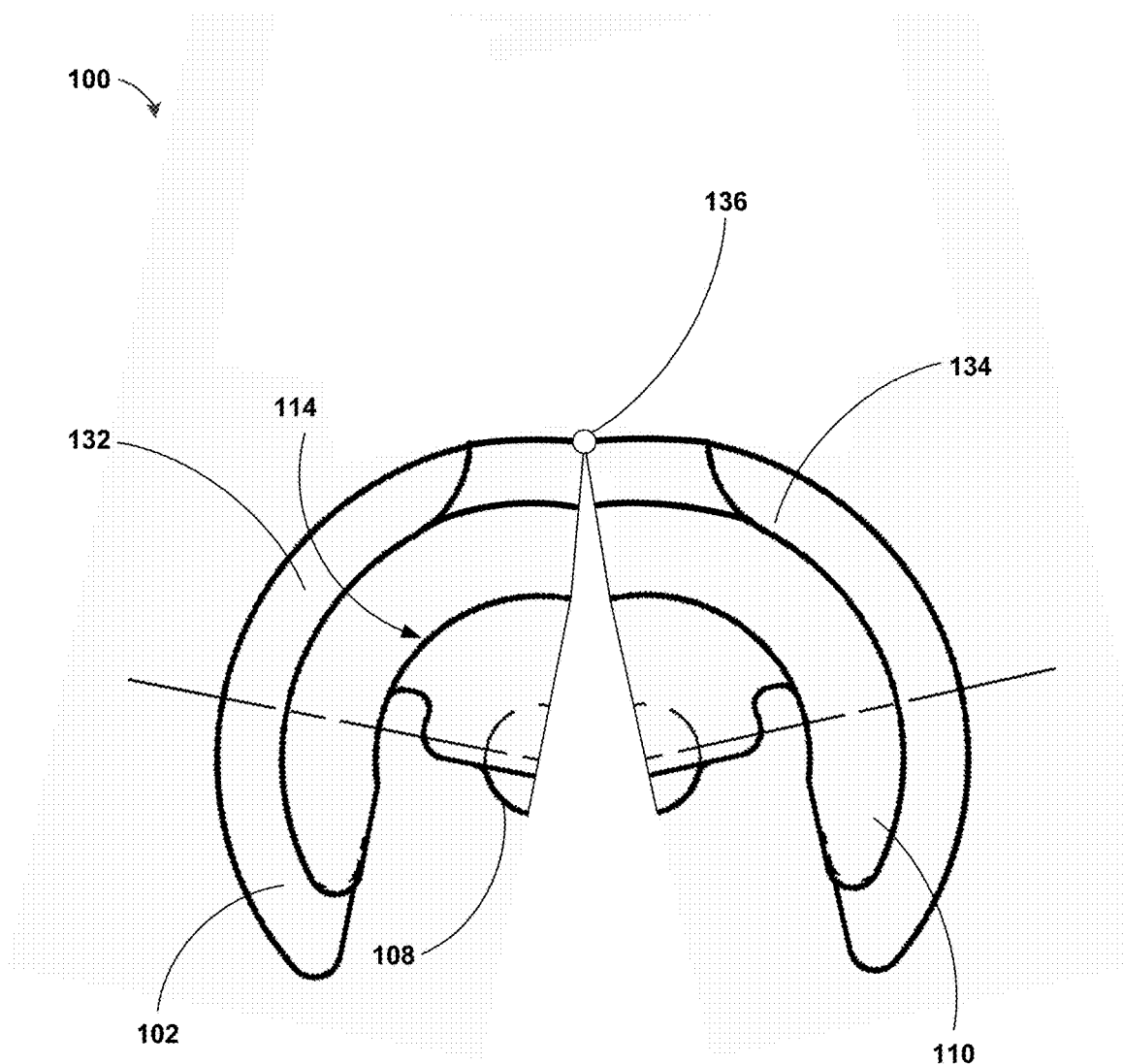
FIG. 9 is a top view of the alignment device of FIG. 7 in an open position.

In another example, as shown in FIG. 7, the support 110 includes a first portion 132 and a second portion 134 coupled together by a hinge 136 positioned along at least a portion of the length of the support 110 such that the support 110 is moveable between an open position and a closed position via the hinge 136. The closed position is shown in FIG. 8, with the first portion 132 and the second portion 134 pushed together. The open position is shown in FIG. 9, with the first portion 132 and the second portion 134 separated. In use, a user would transition the support 110 from the closed position to the open position, place the support 110 in abutment with a drill bit, and then transition the support 110 from the open position to the closed position. In one example, only the support 110 transitions from the closed position to the open position via the hinge 136. In another example, as shown in FIG. 9, the base 102 and the alignment pin 108 also transition from the closed position to the open position.

Figure 10:
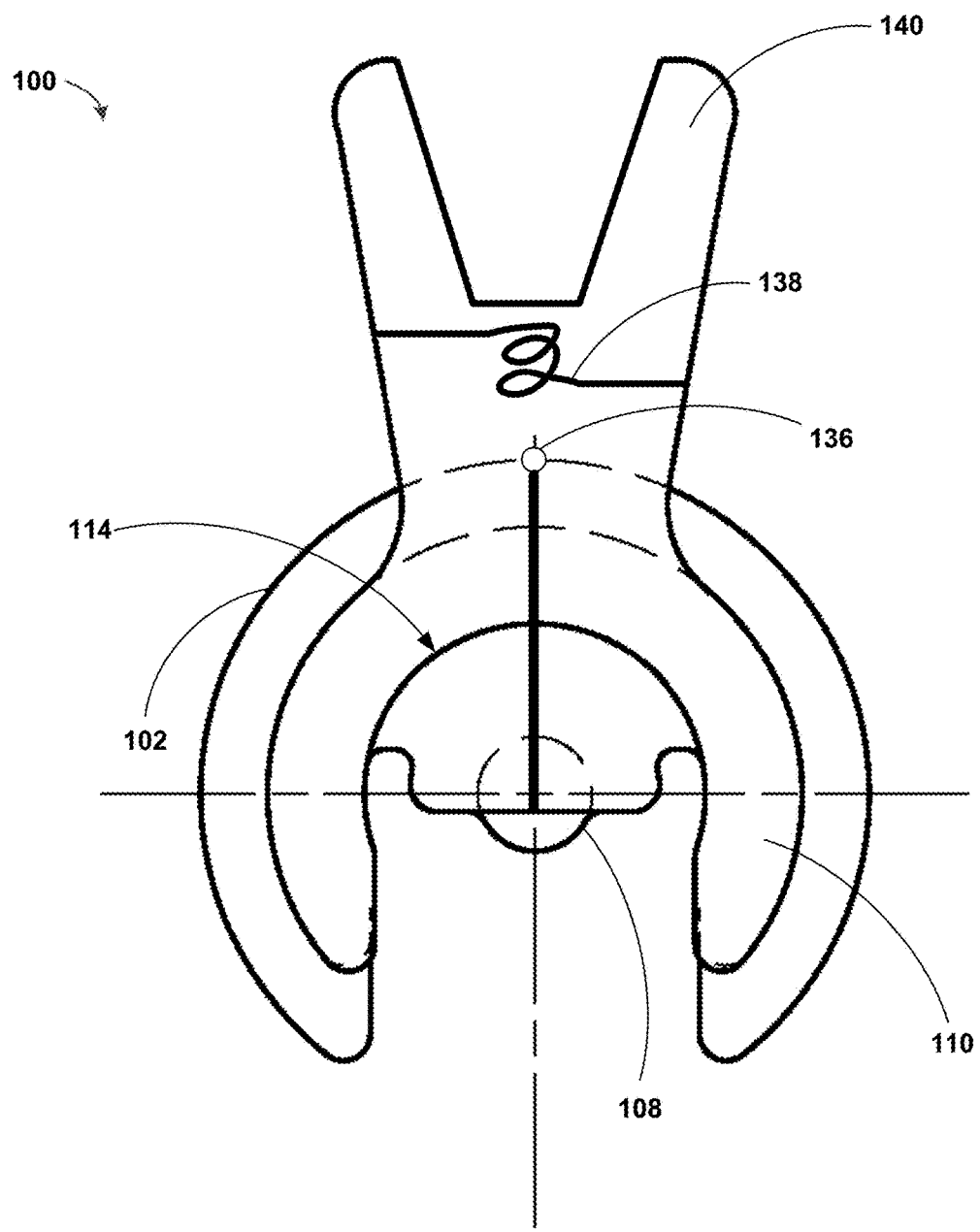
FIG. 10 is a top view of another example alignment device, according to an example embodiment.

FIG. 10 shows another example alignment device 100, according to an example embodiment. As shown in FIG. 10, the hinge 136 may further include a biasing element 138 configured to bias the support 110 to the closed position. The biasing element 138 may include a torsion spring, as an example. Further, the alignment device 100 may also include a clamp 140 extending from the outer surface 121 of the support 110 in a direction away from the longitudinal axis 112 of the alignment pin 108. The clamp 140 is configured to enable an operator to move the support 110 between the open position and the closed position. In particular, as an operator squeezes the clamp 140, the support 110 transitions from the closed position to the open position. When the operator releases the clamp 140, the biasing element 138 causes the support 110 to transition back from the open position to the closed position.

Figure 11:
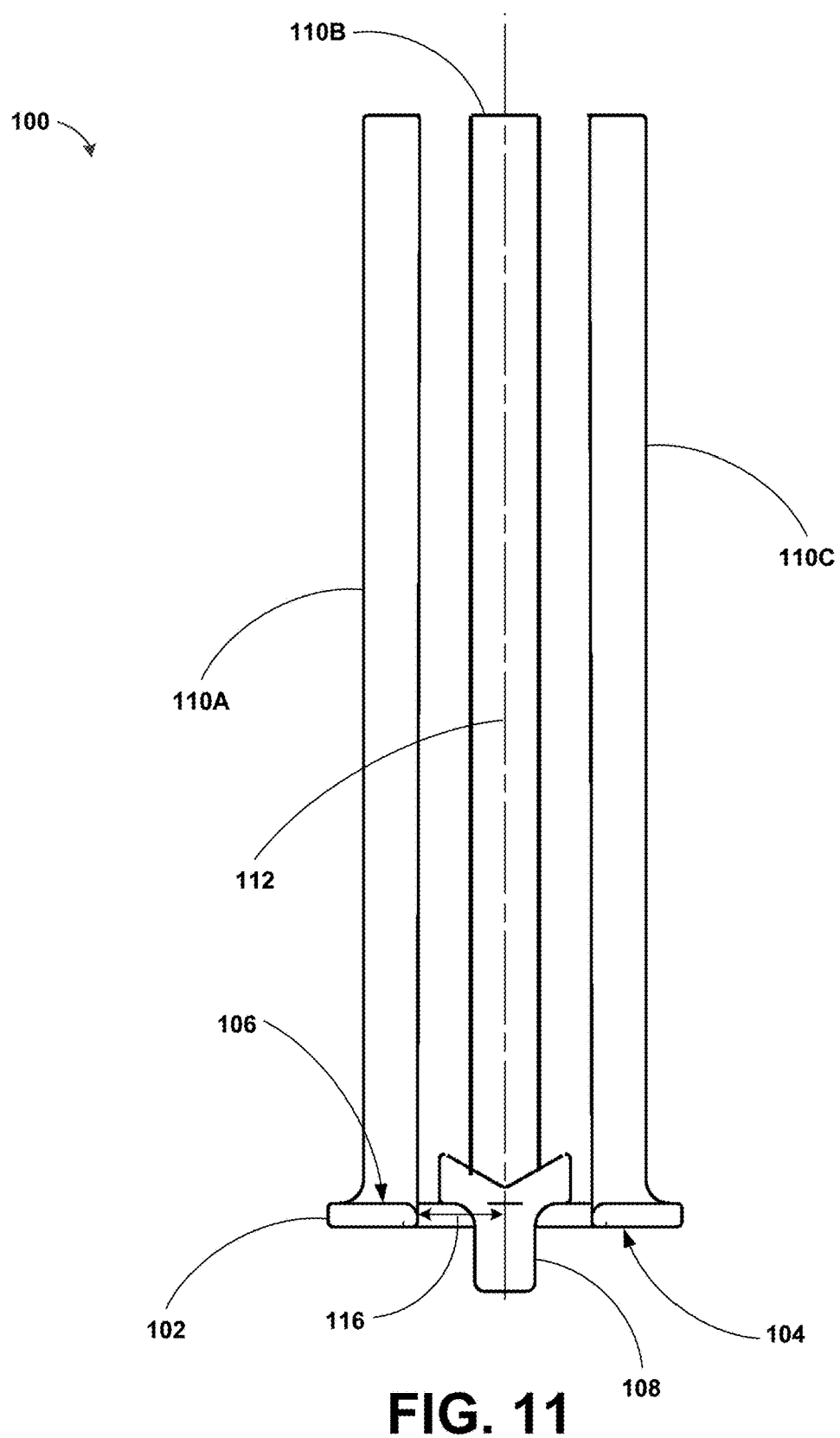
FIG. 11 is a front view of another example alignment device, according to an example embodiment.

FIG. 11 illustrates yet another example alignment device 100, according to an example embodiment. As shown in FIG. 11, the support 110 may include a first support 110A. The longitudinal axis 112 of the alignment pin 108 is separated from an inner surface 114A of the first support 110A by the offset distance 116. In such an example, the alignment device 100 may further include a second support 110B extending from the second surface 106 of the base 102. The longitudinal axis 112 of the alignment pin 108 is separated from an inner surface 114B of the second support 110B by the offset distance 116. The alignment device 100 may further include a third support 110C extending from the second surface 106 of the base 102. The longitudinal axis 112 of the alignment pin 108 is separated from an inner surface 114C the third support 110C by the offset distance 116.

Figure 12:
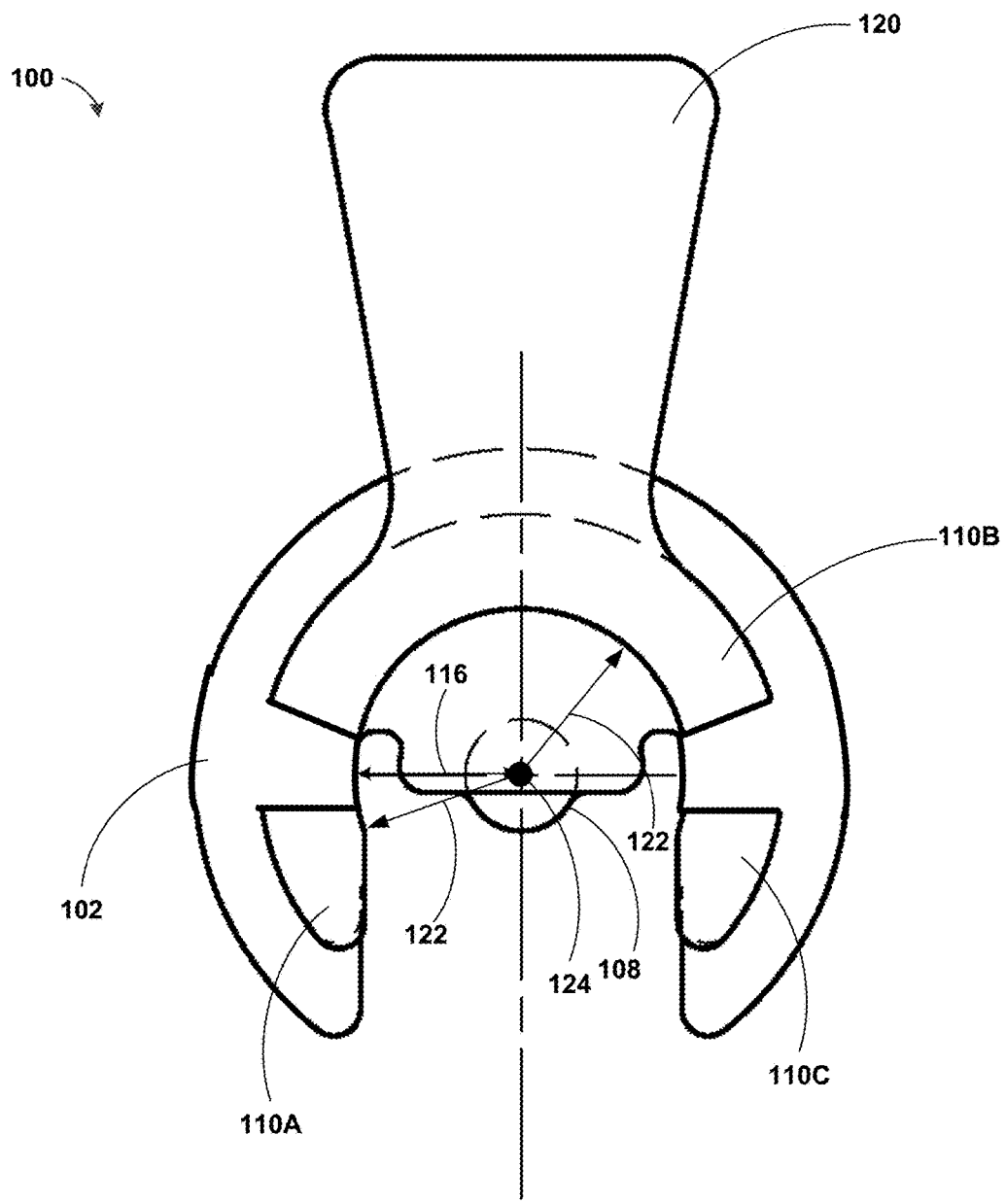
FIG. 12 is a top view another example alignment device, according to an example embodiment.

In one example, as shown in FIG. 12, each of the first support 110A, the second support 110B, and the third support 110C have a radius of curvature 122 along the length of each of the first support 110A, the second support 110B, and the third support 110C. As such, a cross-section of each of the first support 110A, the second support 110B, and the third support 110C in a plane perpendicular to the longitudinal axis 112 of the alignment pin 108 has the radius of curvature 122. In such an example, the radius of curvature 122 is substantially equal to the offset distance 116, and a center of curvature 124 of each of the first support 110A, the second support 110B, and the third support 110C is coaxial with the longitudinal axis 112 of the alignment pin 108.

Figure 13:
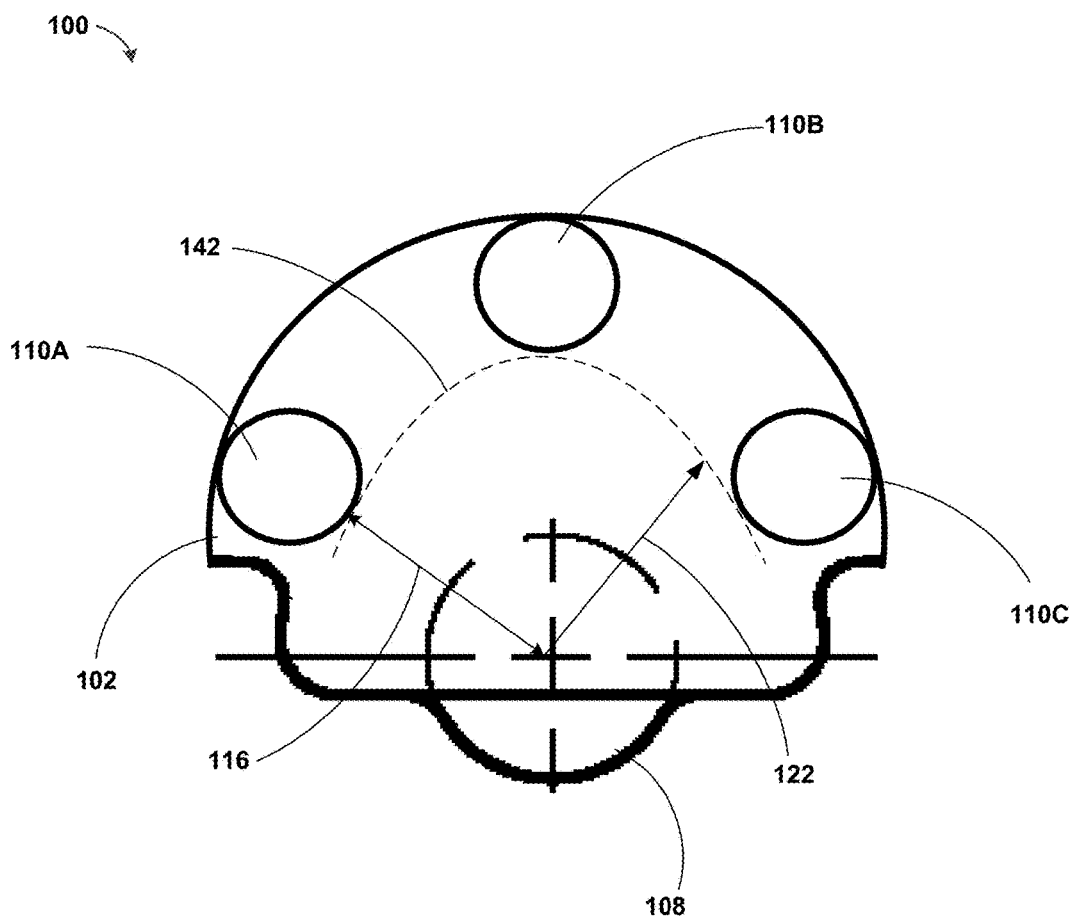
FIG. 13 is a top view another example alignment device, according to an example embodiment.

In another example, as shown in FIG. 13, each of the first support 110A, the second support 110B, and the third support 110C includes a dowel extending from the second surface 106 of the base 102. In such an example, an arc 142 tangential to each of the first support 110A, the second support 110B, and the third support 110C has a radius of curvature 122 substantially equal to the offset distance 116.

The alignment device 100 may include any suitable material, including plastics, metals, and composites as non-limiting examples. In one particular example, each of the support 110, the base 102, and the alignment pin 108 include or are formed of the same material. In particular, the alignment device 100 may include or be formed of only a plastic material in cases where conductivity between the drill bit and the alignment device 100 is not desired.

In another example, the support 110 includes a first material, and the base 102 and the alignment pin 108 include a second material that is different than the first material. In one embodiment of such an example, the first material includes or is a plastic, and the second material includes or is a metal. Such an example may provide increases strength in the base 102 and alignment pin 108 to prevent the alignment pin 108 from breaking off in the pilot hole when in use. In another embodiment, the first material includes a metal, and the second material includes a plastic. Such an arrangement may be preferred in cases where conductivity between the drilling surface and the alignment device 100 is not desired.

In another example, the support 110 may include a magnetic material such that the support 110 is magnetically attracted to the drill bit when the drill bit is positioned adjacent to the support 110. Such an arrangement may help position the drill bit adjacent to the support 110 when in use. In particular, the magnetic material of the support 110 may be beneficial in designs where the cross-section of the support 110 in a plane perpendicular to the longitudinal axis 112 of the alignment pin 108 includes a minor arc 126, as shown in FIG. 4. In yet another embodiment, the base 102 and the alignment pin 108 may include a magnetic material such that the base 102 and alignment pin 108 are magnetically attracted to the drilling surface including the pilot hole into which the alignment pin 108 is configured to be positioned.

In certain embodiments, such as shown in any one of FIGS. 1-13, example devices or components thereof are made using an additive-manufacturing machine, such as stereolithography, multi-jet modeling, inkjet printing, selective laser sintering/melting, and fused filament fabrication, among other possibilities. An example additive-manufacturing machine creates the alignment device 100 described in any one of FIGS. 1-13 using a single material. Such a material includes stainless steel, titanium, nickel super-alloy, aluminum, polymer composites (e.g., carbon fiber reinforced nylon) and polymer nanocomposites (e.g., carbon nanotube filled nylon), polyether ether ketone (PEEK), polyethylene (PE), or polypropylene (PP), as examples. In another example, the additive-manufacturing process is a multi-material additive-manufacturing process such that various components of the alignment device 100 are formed using a material with a material property than the other components. In such an example, as discussed above, the support 110 includes a first material, and the base 102 and the alignment pin 108 includes a second material that is different than the first material. In one particular example, the first material provides a flexible material configured such that the support 110 is moveable between an open position and a closed position, and the second material provides a rigid material that provides increased strength and rigidity to the alignment pin 108 and base 102. The flexible first material enables a user to position the alignment device 100 in abutment with a drill bit while the support 110 is in the open position, and the support 110 snaps shut around the drill bit in the closed position. Other examples are possible as well.

Figure 14:
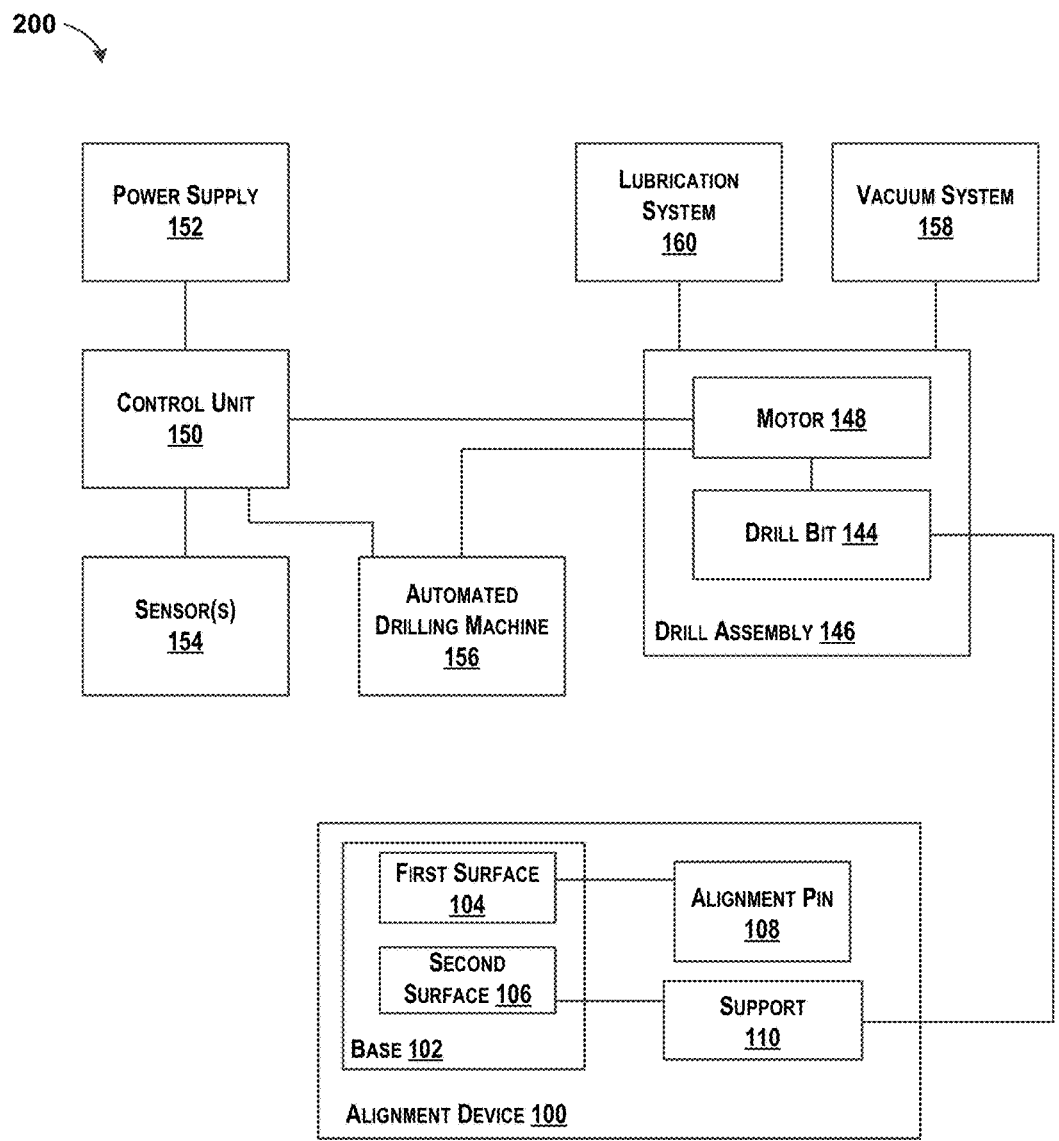
FIG. 14 is a block diagram of an example system, according to an example embodiment.

FIG. 14 is a block diagram of an example system 200 for aligning a drill bit 144 with respect to a pilot hole, such as pilot hole 162 (shown in FIG. 16A). The system 200 includes a drill assembly 146 including the drill bit 144 and a motor 148 being configured to rotate the drill bit 144. The system 200 also includes an alignment device 100 configured to be positioned in abutment with the drill bit 144 of the drill assembly 146. The alignment device 100 may include any of the features shown in any one of FIGS. 1-13. In particular, the alignment device 100 may include a base 102 having a first surface 104 and a second surface 106, where the first surface 104 is opposite the second surface 106. The alignment device 100 may also include an alignment pin 108 extending from the first surface 104 of the base 102. The alignment device 100 may also include a support 110 extending from the second surface 106 of the base 102 and positioned such that a longitudinal axis 112 of the alignment pin 108 is separated from an inner surface 114 of the support 110 by an offset distance 116. The inner surface 114 of the support 110 has a radius of curvature 122 along a length 118 of the support 110. The radius of curvature 122 is substantially equal to the offset distance 116, and a center of curvature 124 of the support 110 is coaxial with the longitudinal axis 112 of the alignment pin 108.

The system 200 may also include a control unit 150 coupled to a power supply 152 and sensor(s) 154. In one embodiment, the control unit 150 is further coupled to an automated drilling machine 156 which, in turn, is coupled to the motor 148 that is coupled to the drill assembly 146. In another embodiment, the control unit 150 may be independently coupled to both the automated drilling machine 156 and the motor 148. In yet another embodiment, the control unit 150 may be coupled to the motor 148 and the automated drilling machine 156 may be absent.

When present, the automated drilling machine 156 may be configured to receive coordinate data from the control unit 150 describing the desired location of the hole to be cut. The automated drilling machine 156 may be further configured to move the drill bit 144 to the desired hole location. The motor 148 may be configured to move the drill bit 144 in a rotational manner to form a hole in a drilling surface. The system 200 may further include a vacuum system 158 coupled to the drill assembly 146 to remove debris from drilling, which eliminates disassembly and reassembly for cleaning. The system 200 may also include a lubrication system 160 coupled to the drill assembly 146 so as to provide lubrication to the drilling surface.

The control unit 150 may be configured to operate the drill assembly 146, and to provide power from the power supply 152 to the motor 148 to do so. The control unit 150 may also be configured to operate the automated drilling machine 156 by providing power from the power supply 152 and coordinate data from the sensors 154. The control unit 150 may receive outputs from the sensors 154 to determine when to initiate operation of the drill assembly 146. Thus, within examples, the control unit 150 may include one or more processors and data storage for storing instructions executable by the processors to perform functions of the control unit 150. The sensors 154 may include one or more gyroscopes, one or more accelerometers, one or more magnetometers, one or more light sensors, and/or one or more infrared sensors. The sensors 154 may more generally include sensors for detecting a location of the drill bit 144 with respect to a pilot hole in a drilling surface.

Figure 15:
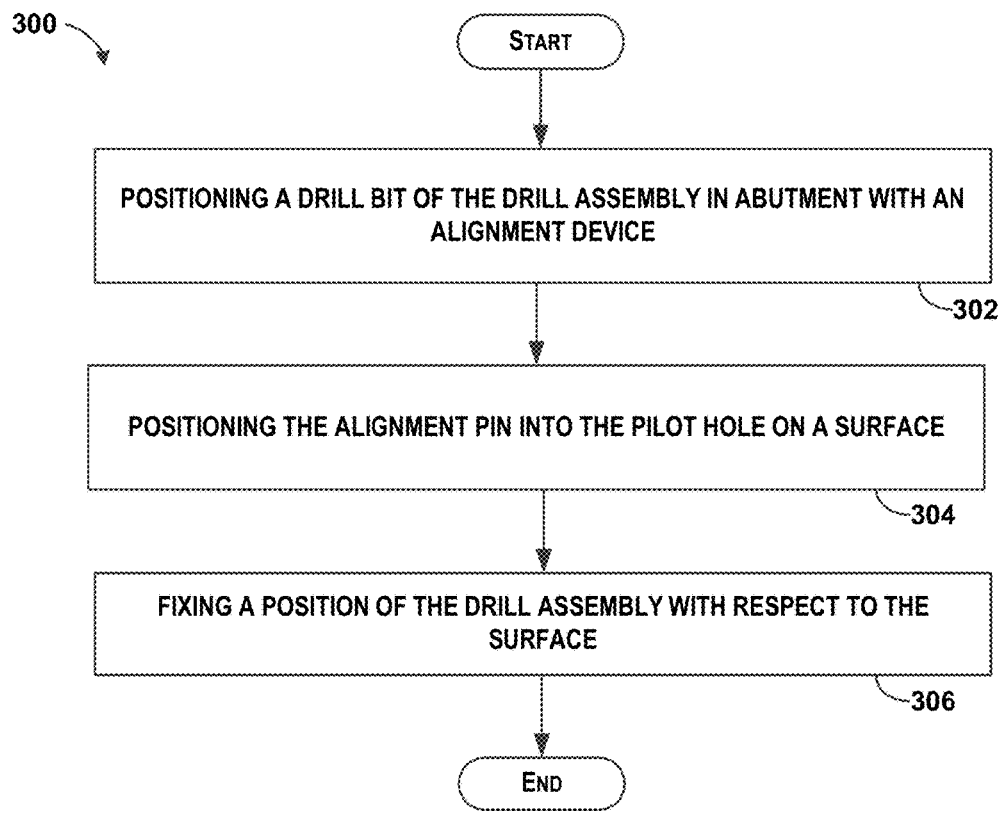
FIG. 15 is a flowchart of an example method, according to an example embodiment.

FIG. 15 is a block diagram of an example method for aligning a drill assembly 146 with respect to a pilot hole 162. Method 300 includes one or more operations, functions, or actions as illustrated by one or more of blocks 302-306. Although the blocks are illustrated in a sequential order, these blocks may also be performed in parallel, and/or in a different order than those described herein. Also, the various blocks may be combined into fewer blocks, divided into additional blocks, and/or removed based upon the desired implementation.

Initially, at block 302, the method 300 includes positioning a drill bit 144 of the drill assembly 146 in abutment with an alignment device 100. The alignment device 100 may include any of the features shown in any one of FIGS. 1-13. In particular, the alignment device 100 may include a base 102 having a first surface 104 and a second surface 106, where the first surface 104 is opposite the second surface 106. The alignment device 100 may also include an alignment pin 108 extending from the first surface 104 of the base 102. The alignment device 100 may also include a support 110 extending from the second surface 106 of the base 102 and positioned such that a longitudinal axis 112 of the alignment pin 108 is separated from an inner surface 114 of the support 110 by an offset distance 116. The inner surface 114 of the support 110 has a radius of curvature 122 along a length 118 of the support 110. The radius of curvature 122 is substantially equal to the offset distance 116, and a center of curvature 124 of the support 110 is coaxial with the longitudinal axis 112 of the alignment pin 108. As shown in FIG. 16A, the pilot hole 162 may be pre-drilled into the surface 164.

At block 304, the method 300 includes positioning the alignment pin 108 into the pilot hole 162 on the surface 164. When the alignment pin 108 is positioned into the pilot hole 162 on the surface 164, the longitudinal axis 112 of the alignment pin 108 is coaxial with a center of the pilot hole 162. Such an arrangement is illustrated in FIG. 16B. At block 306, the method 300 includes fixing a position of the drill assembly 146 with respect to the surface 164. In one particular example, fixing the position of the drill assembly 146 with respect to the surface 164 comprises clamping the drill assembly 146 to the surface 164. In particular, as shown in FIG. 16B, the drill assembly 146 may include a top portion 147 and a bottom portion 149 that may be clamped together on either side of the surface 164.

Positioning the drill bit 144 of the drill assembly 146 in abutment with an alignment device 100 may take a variety of forms. In one example, the alignment device 100 is positioned in abutment with the drill bit 144 prior to positioning the alignment pin 108 into the pilot hole 162 on the surface 164. In another example, the alignment pin 108 is initially positioned into the pilot hole 162 on the surface 164, and then the drill bit 144 is positioned in abutment with the alignment device 100.

In one example, the method 300 further includes removing the alignment device 100 from the pilot hole 162 and from abutment with the drill bit 144, and drilling through the surface 164 using the drill bit 144 of the drill assembly 146. These method steps are illustrated in FIGS. 16C and 16D, respectively.

In another example, the step of positioning the drill bit 144 in abutment with the alignment device 100 comprises (i) transitioning the support 110 from a closed position to an open position, (ii) positioning the drill bit 144 in abutment with the support 110 while the support 110 is in the open position, and (iii) transitioning the support 110 from the open position to the closed position. As described above, in one example, the support 110 may comprise a flexible material such that the support 110 is moveable between the open position and the closed position. The flexible material enables a user to position the alignment device 100 in abutment with the drill bit 144 while the support 110 is in the open position, and the support 110 snaps shut around the drill bit 144 in the closed position. In another example, as the support 110 includes a first portion 132 and a second portion 134 coupled together by a hinge 136 positioned along at least a portion of the length of the support 110 such that the support 110 is moveable between the open position and the closed position via the hinge 136. Other methods of transitioning the support 110 between the closed position and the open position are possible as well.

In the above description, numerous specific details are set forth to provide a thorough understanding of the disclosed concepts, which may be practiced without some or all of these particulars. In other instances, details of known devices and/or processes have been omitted to avoid unnecessarily obscuring the disclosure. While some concepts have been described in conjunction with specific examples, it will be understood that these examples are not intended to be limiting.

In FIG. 15, referred to above, the blocks may represent operations and/or portions thereof and lines connecting the various blocks do not imply any particular order or dependency of the operations or portions thereof. It will be understood that not all dependencies among the various disclosed operations are necessarily represented. FIG. 15 and the accompanying disclosure describing the operations of the method(s) set forth herein should not be interpreted as necessarily determining a sequence in which the operations are to be performed. Rather, although one illustrative order is indicated, it is to be understood that the sequence of the operations may be modified when appropriate. Accordingly, certain operations may be performed in a different order or simultaneously. Additionally, those skilled in the art will appreciate that not all operations described need be performed.

As used herein, "coupled" means associated directly as well as indirectly. For example, a member A may be directly associated with a member B, or may be indirectly associated therewith, e.g., via another member C. It will be understood that not all relationships among the various disclosed elements are necessarily represented.

Unless otherwise indicated, the terms "first," "second," etc. are used herein merely as labels, and are not intended to impose ordinal, positional, or hierarchical requirements on the items to which these terms refer. Moreover, reference to, e.g., a "second" item does not require or preclude the existence of, e.g., a "first" or lower-numbered item, and/or, e.g., a "third" or higher-numbered item.

Reference herein to "one embodiment" or "one example" means that one or more feature, structure, or characteristic described in connection with the example is included in at least one implementation. The phrases "one embodiment" or "one example" in various places in the specification may or may not be referring to the same example.

As used herein, a system, apparatus, device, structure, article, element, component, or hardware "configured to" perform a specified function is indeed capable of performing the specified function without any alteration, rather than merely having potential to perform the specified function after further modification. In other words, the system, apparatus, structure, article, element, component, or hardware "configured to" perform a specified function is specifically selected, created, implemented, utilized, programmed, and/or designed for the purpose of performing the specified function. As used herein, "configured to" denotes existing characteristics of a system, apparatus, structure, article, element, component, or hardware which enable the system, apparatus, structure, article, element, component, or hardware to perform the specified function without further modification. For purposes of this disclosure, a system, apparatus, structure, article, element, component, or hardware described as being "configured to" perform a particular function may additionally or alternatively be described as being "adapted to" and/or as being "operative to" perform that function.

The description of the different advantageous arrangements has been presented for purposes of illustration and description, and is not intended to be exhaustive or limited to the embodiments in the form disclosed. Many modifications and variations will be apparent to those of ordinary skill in the art. Further, different advantageous embodiments may provide different advantages as compared to other advantageous embodiments. The embodiment or embodiments selected are chosen and described in order to best explain the principles of the embodiments, the practical application, and to enable others of ordinary skill in the art to understand the disclosure for various embodiments with various modifications as are suited to the particular use contemplated.

What is claimed is:

1. An alignment device comprising:
a base having a first surface and a second surface, wherein the first surface is opposite the second surface;
an alignment pin extending from the first surface of the base, wherein the alignment pin is solid such that it does not include a through-hole; and
a support extending from the second surface of the base, wherein the support is positioned such that a longitudinal axis of the alignment pin is separated from an inner surface of the support by an offset distance, wherein the inner surface of the support has a radius of curvature along a length of the support, wherein the radius of curvature is substantially equal to the offset distance, wherein a center of curvature of the support is coaxial with the longitudinal axis of the alignment pin, wherein the support is moveable between an open position and a closed position and wherein the inner surface of the support comprises an arc of a circle such that there is a gap along the length of the support.

2. The alignment device of claim 1, wherein a cross-section of the support in a plane perpendicular to the longitudinal axis of the alignment pin comprises a minor arc.

3. The alignment device of claim 1, wherein a cross-section of the support in a plane perpendicular to the longitudinal axis of the alignment pin comprises a major arc.

4. The alignment device of claim 1, wherein the support comprises a flexible material configured to enable the support to be moveable between the open position and the closed position.

5. The alignment device of claim 1, wherein the support comprises a first portion and a second portion coupled together by a hinge positioned along at least a portion of the length of the support configured to enable the support to be moveable between the open position and a closed position.

6. The alignment device of claim 5, wherein the hinge further includes a biasing element configured to bias the support to the closed position.

7. The alignment device of claim 5, wherein the alignment device further comprises a clamp extending from an outer surface of the support in a direction away from the longitudinal axis of the alignment pin, wherein the clamp is configured to enable an operator to move the support between the open position and the closed position.

8. The alignment device of claim 1, wherein a ratio of the length of the support to the radius of curvature ranges from about 3:1 to about 20:1.

9. The alignment device of claim 1, further comprising a fin extending from an outer surface of the support in a direction away from the longitudinal axis of the alignment pin, wherein the fin is configured to enable an operator to grip the alignment device.

10. The alignment device of claim 1, wherein the support comprises a first support, and wherein the alignment device further comprises:
 a second support extending from the second surface of the base, wherein the longitudinal axis of the alignment pin is separated from an inner surface of the second support by the offset distance; and
 a third support extending from the second surface of the base, wherein the longitudinal axis of the alignment pin is separated from an inner surface of the third support by the offset distance.

11. The alignment device of claim 10, wherein each of the first support, the second support, and the third support comprise a dowel extending from the second surface of the base, and wherein an arc tangential to each of the first support, the second support, and the third support has a radius of curvature substantially equal to the offset distance.

12. The alignment device of claim 1, wherein the support comprises a first material, and wherein the base and the alignment pin comprises a second material that is different than the first material.

13. A system for aligning a drill bit with respect to a pilot hole, the system comprising:
 a drill assembly comprising:
  the drill bit; and
  a motor being configured to rotate the drill bit; and
 an alignment device configured to be positioned in abutment with the drill bit of the drill assembly, the alignment device comprising:
  a base having a first surface and a second surface, wherein the first surface is opposite the second surface;
  an alignment pin extending from the first surface of the base, wherein the alignment pin is solid such that it does not include a through-hole; and
  a support extending from the second surface of the base, wherein the support is positioned such that a longitudinal axis of the alignment pin is separated from an inner surface of the support by an offset distance, wherein the inner surface of the support has a radius of curvature along a length of the support, wherein the radius of curvature is substantially equal to the offset distance, wherein a center of curvature of the support is coaxial with the longitudinal axis of the alignment pin, and wherein the inner surface of the support comprises an arc of a circle such that there is a gap along the length of the support.

14. The system of claim 13, wherein the support comprises a flexible material such that the support is moveable between an open position and a closed position, and wherein the support is configured to be positioned around the drill bit as the support is transitioned from the open position to the closed position.

15. The system of claim 13, further comprising:
 a control unit coupled to a power supply, wherein the control unit is configured to control a location and an actuation of the drill bit to a desired location via the motor.

16. The system of claim 13, further comprising:
 a plurality of sensors configured to detect a position of the drill bit with respect to the pilot hole.

17. A method for aligning a drill assembly with respect to a pilot hole, the method comprising:
 positioning a drill bit of the drill assembly in abutment with an alignment device, wherein the alignment device comprises (i) a base having a first surface and a second surface, wherein the first surface is opposite the second surface, (ii) an alignment pin extending from the first surface of the base, wherein the alignment pin is solid such that it does not include a through-hole, and (iii) a support extending from the second surface of the base, wherein the support is positioned such that a longitudinal axis of the alignment pin is separated from an inner surface of the support by an offset distance, wherein the inner surface of the support has a radius of curvature along a length of the support, wherein the radius of curvature is substantially equal to the offset distance, wherein a center of curvature of the support is coaxial with the longitudinal axis of the alignment pin, and wherein the inner surface of the support comprises an arc of a circle such that there is a gap along the length of the support;
 positioning the alignment pin into the pilot hole on a surface such that the longitudinal axis of the alignment pin is coaxial with a center of the pilot hole; and
 fixing a position of the drill assembly with respect to the surface.

18. The method of claim 17, further comprising:
 removing the alignment device from the pilot hole and from abutment with the drill bit; and
 drilling through the surface using the drill bit of the drill assembly.

19. The method of claim 17, wherein positioning the drill bit in abutment with the alignment device comprises:
 transitioning the support from a closed position to an open position;
 positioning the drill bit in abutment with the support while the support is in the open position; and
 transitioning the support from the open position to the closed position.

20. The method of claim 17, wherein fixing the position of the drill assembly with respect to the surface comprises clamping the drill assembly to the surface.

* * * * *